INVENTORS:
Emile Plumat
Pierre Bohain
Albert Servais

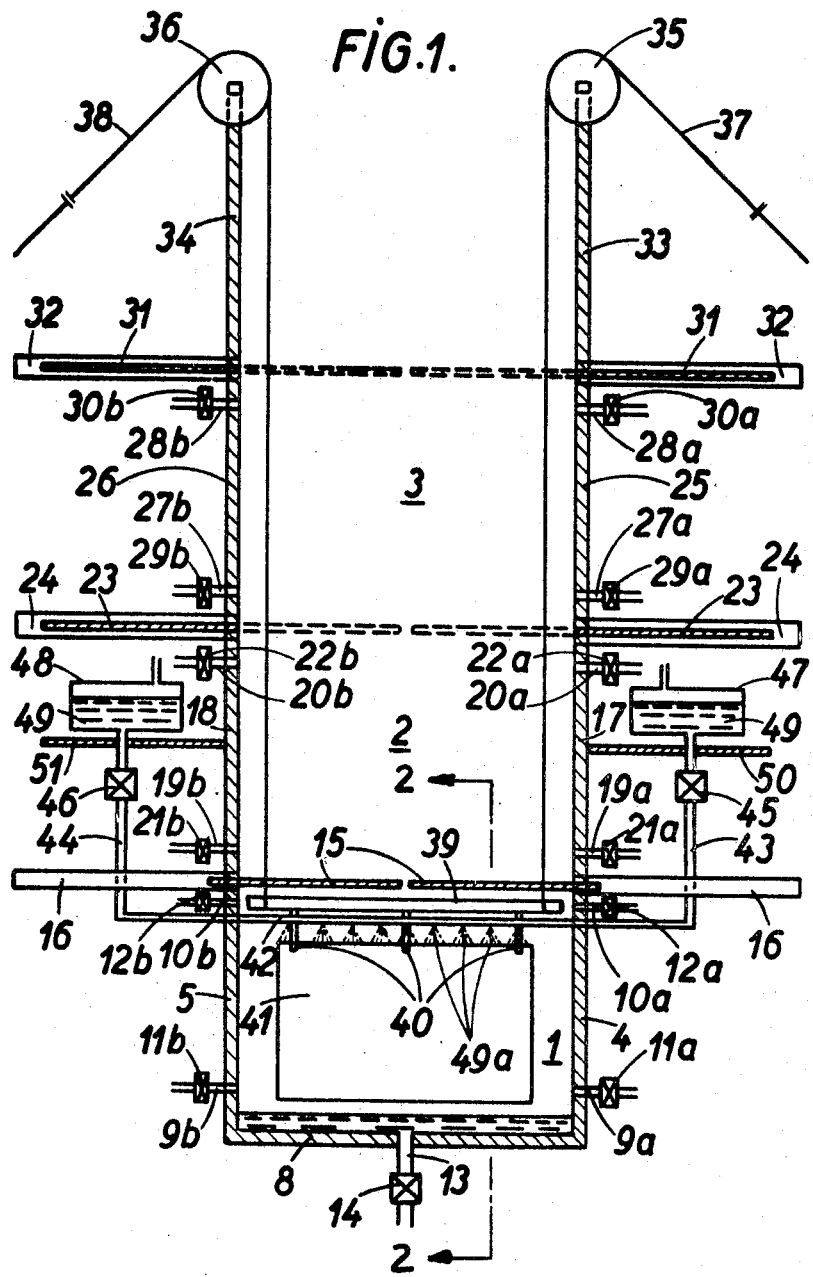

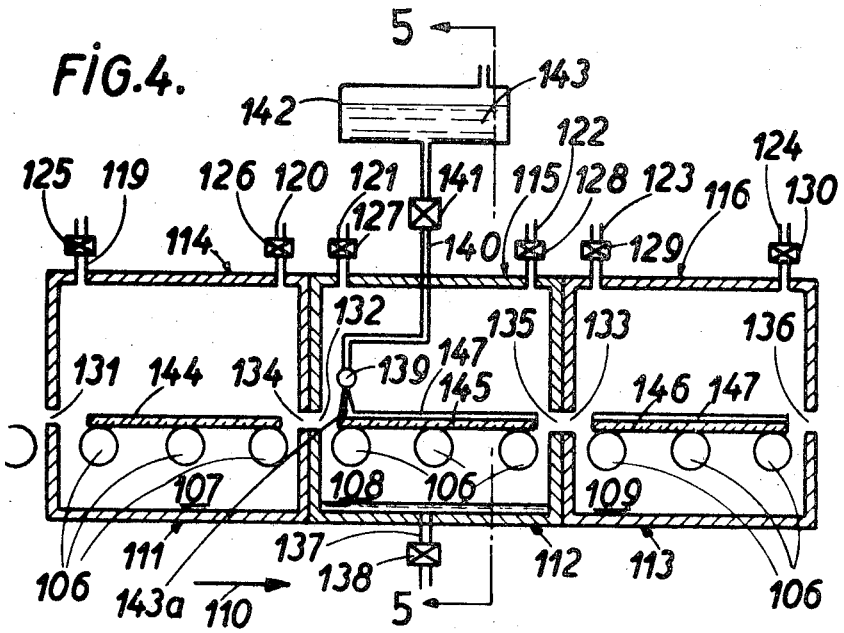
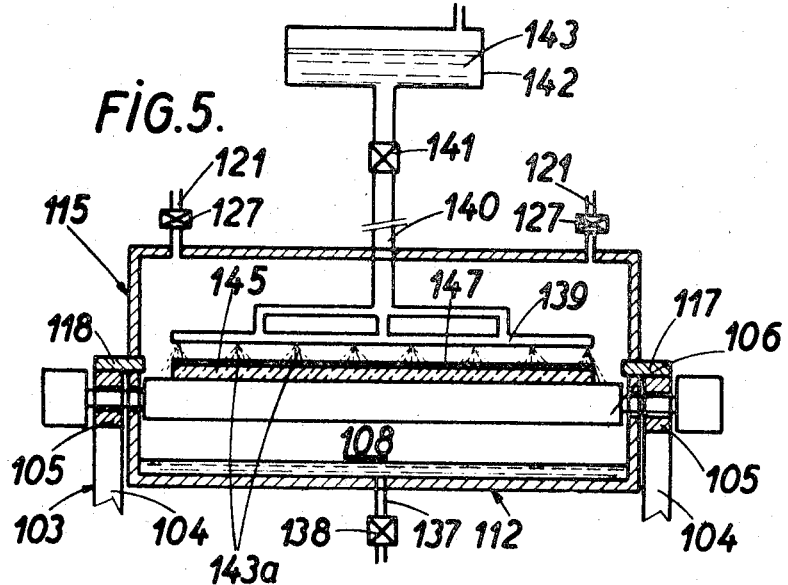

United States Patent Office 3,519,467
Patented July 7, 1970

3,519,467
FORMATION OF THIN OXIDE LAYERS
Emile Plumat, Gilly, Pierre Bohain, Montignies-sur-Sambre, and Albert Servais, Gosselies, Belgium, assignors to Glaverbel S.A., Brussels, Belgium
Filed May 17, 1967, Ser. No. 639,082
Claims priority, application Luxembourg, May 18, 1966, 51,137
Int. Cl. C03c 17/10
U.S. Cl. 117—54                             10 Claims

ABSTRACT OF THE DISCLOSURE

An improved technique for coating a surface with a metal oxide layer of uniform thickness by applying a solution of a compound, other than the oxide, of the metal, the uniformity of the resulting oxide layer being improved by preliminarily moistening, or superficially wetting the surface to be coated with a solvent for the starting metal compound, the metal compound being subsequently oxidized to form the desired coating.

BACKGROUND OF THE INVENTION

The present invention relates to the surface coating of glass and other materials, and particularly to a process for forming metal oxide coatings of uniform thickness on such materials.

It has already been suggested to form a metal oxide coating, or layer, on materials such as glass by forming the oxide in situ, this involving first applying a solution of a different compound of the metal, i.e., a compound other than the oxide. However, the previously suggested processes of this type have not proven to be completely satisfactory because they have been incapable of reliably producing coatings of uniform thickness and quality. Moreover, in order to carry out these processes, it is necessary to immerse the material in a bath of the metal compound solution, with the result that the processes can only be employed to simultaneously coat both sides of the glass sheet.

It is therefore a primary object of the present invention to eliminate these drawbacks and difficulties.

A more specific object of the present invention is to improve the quality of oxide coatings on the surfaces of glass and other objects.

Yet another object of the present invention is to provide metal oxide coatings or more uniform thickness.

Still another object of the present invention is to permit metal oxide coatings to be applied to but one surface of a sheet of material.

SUMMARY OF THE INVENTION

These and other objects according to the present invention are achieved by a process for coating the surface of an object with a metal oxide layer, starting with a compound, other than the oxide, of the metal, including the steps of moistening the surface with a solvent for the starting metal compound, applying a solution of the starting metal compound uniformly on the surface in an inert atmosphere, and converting the applied metal compound into at least one metal oxide to form the layer. The apparatus utilized in performing the process essentially includes at least one first chamber for holding the object, first supply means associated with the chamber for filling it with a vapor of a solvent for the metal compound, and second supply means associated with the chamber for applying a solution of the metal compound to the object after the chamber has been filled with the solvent vapor. The apparatus further includes at least one further chamber for receiving the object after it leaves the first chamber, and heating means associated with the further chamber for maintaining its interior at a sufficiently high temperature to oxidize the metal compound.

The present invention is based on the discovery that a much improved uniformity of the oxide coating is possible if the surface to be coated, when the metal compound solution is applied thereto, has been previously provided with a superficial uniform film of a solvent for the metal compound. This solvent may be the solvent, or one of the solvents, used for forming the solution of the metal compound, or some other solvent compatible with the solvents used in such solution. It is important to avoid any premature conversion, i.e., oxidation, of the dissolved metal compound because this conversion must commence only when the solution is present in the form of a barely perceptible layer on the surface to be coated. Consequently water vapor must be excluded from the atmosphere to which the solvent-moistened surface is exposed and in which the metal compound solution is applied.

The process according to the invention can be applied for coating glass, ceramic, polished metal, plastics and other surfaces. However, the invention is employed primarily for coating glass, particularly glass in sheet form, and it is for that reason that the present invention will be described with specific reference to such material.

The reasons for the improved results obtainable as a result of the preparatory moistening of the glass surface with solvent, preferably an organic solvent, are not known with certainty. It is remarkable that this preparatory slight wetting, or moistening, is of such effect that a very uniform metal oxide coating can be formed even if the metal compound solution is poured or sprayed onto the moistened surface. By way of comparison, in order to obtain uniformity in the prior art processes, it was necessary to apply the metal compound solution by dipping the glass into the solution and even then the best results obtainable did not equal those which can be realized by the present invention. It is to be understood, however, that the technique of applying the metal compound solution by immersion of the surface to be coated in a mass of the solution, e.g., by dipping the sheet glass or other article so as to coat more than one surface, is not excluded from the scope of the invention, although this is not the preferred procedure.

The preparatory treatment of the surface is described as a "light wetting" or "moistening" to indicate it is carried out in such a way as to leave no excess solvent liquid on the surface when the metal compound solution is applied, the film of solvent being only just perceptible or not perceptible at all under ordinary observation. The manner in which this slightly moist condition of the surface is obtained is not critical but the preferred method is to expose the surface to a vapor of the selected solvent (which may be a single compound or a mixture of compounds) by disposing it in an enclosure filled with such vapor. The conditions of this treatment may be, and preferably are, such that the vapor concentration is near to the saturation point. However, condensation of solvent in the form of apparent droplets on the surface must be prevented. Another method comprises throughly wetting the surface with the solvent, by a dipping or rinsing treatment or otherwise, and then drying the surface to a point at which an invisible or just perceptible uniform solvent film remains. The solvent may contain a wetting agent or surfactant. The precise point at which drying must be terminated when using this alternative method is not easy to determine, however, so that the vapor contact method is much preferred. Whatever method be adopted, the surface to be treated should of course be thoroughly clean.

The metal compound solution is preferably applied by spraying or pouring the solution onto the surface while it is maintained in the solvent vapor atmosphere used for producing the preparatory moistening.

BRIEF DESCRIPTION OF THE DRAWINGS

FIG. 1 is a cross-sectional, elevational view of one embodiment of apparatus according to the invention.

FIG. 4 is a cross-sectional, elevational view of a third embodiment of apparatus according to the invention.

FIG. 5 is a cross-sectional view taken along the line 5—5 of FIG. 4.

DESCRIPTION OF THE PREFERRED EMBODIMENTS

Apparatus according to the present invention is arranged to conduct articles to be coated from a chamber or chambers in which the solvent vapor atmosphere can be established and the metal compound solution applied, to a following chamber or chambers in which conversion of the applied metal compound or compounds takes place in situ to form a metal oxide coating on the articles. Apparatus for carrying out the process according to the invention in this way, includes a chamber or chambers equipped with means for charging it or them with solvent vapor and with means for discharging metal compound solution onto an article being held in a solvent vapor atmosphere in the, or a, chamber, and a further chamber or chambers into which articles can be conveyed from the first chamber or chambers and which is equipped with heating means for maintaining the interior of the further chamber or chambers at an elevated temperature. The apparatus preferably comprises an article transportation device for transporting articles from one chamber to the next.

Figure 2:
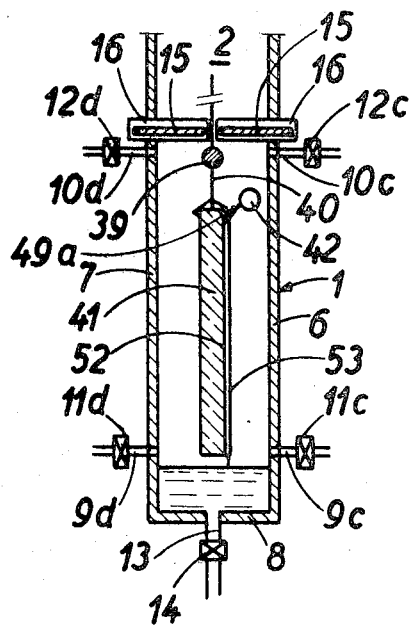
FIG. 2 is a side elevational view taken along the line 2—2 in FIG. 1.

In the apparatus shown in FIGS. 1 and 2 there are provided three superimposed chambers 1, 2, 3.

The bottom chamber 1 is defined by side walls 4 and 5, front and rear walls 6 and 7 and a base 8. Pipes 9a, 9b, 9c, 9d, 10a, 10b, 10c, and 10d having valves 11a, 11b, 11c, 11d, 12a, 12b, 12c, and 12d respectively, extend through the lower and upper portions of the side walls 4 and 5 and the longitudinal walls 6 and 7, respectively. An evacuation conduit 13 having a valve 14 extends through the base 8. Between the chamber 1 and the chamber 2 there are four shutters, or partitions, 15 which can be retracted into respective housings 16.

The front, rear and side walls of chamber 1 are upwardly prolongated to form the front, rear and side walls of chambers 2 and 3. The side walls of chamber 2 are indicated at 17 and 18. The chamber 2 has lower and upper pipes corresponding to the pipes 9a–9d and 10a–10d of chamber 1. FIG. 1 shows two of the lower pipes 19a and 19b and two of the upper pipes 20a and 20b of chamber 2 and their respective valves 21a, 21b, 22a and 22b respectively. Between the chamber 2 and the top chamber 3 there are four shutters, or partitions, 23 shown retracted into their respective housings 24.

The side walls of chamber 3 are indicated at 25 and 26. This chamber likewise has four lower and four upper pipes fitted with valves. FIG. 1 shows two of the lower pipes 27a and 27b and their respective valves 29a and 29b, and two of the upper pipes 28a and 28b and their respective valves 30a and 30b. At the top of chamber 3 there are four shutters, or partitions, 31 shown retracted into their respective housings 32.

The side walls of the chambers are prolongated upwardly to provide supports 33 and 34 for pulley wheels 35 and 36. Cables 37 and 38 run over these wheels and extend downwardly to a horizontal bar 39. The other ends of the cables 37 and 38 are wound on a motor driven drum (not shown). A series of tongs 40 are fitted onto the bar 39 so that a sheet of glass 41 can be suspended from the bar as shown, and this sheet can be readily lowered into and raised through the chambers 1, 2 and 3.

At the upper portion of the chamber 1 there is a spray pipe 41 the ends of which are connected to pipes 43 and 44 which have valves 45 and 46, respectively, and which are connected to reservoirs 47 and 48, respectively, holding quantities of a liquid 49. The reservoirs 47 and 48 are supported by brackets 50 and 51 attached to the side walls 17 and 18 of chamber 2.

The apparatus shown in FIGS. 1 and 2 functions as follows:

After a sheet of glass, such as sheet 41, has been lowered into the chamber 1, the shutters 15 are closed so as to substantially isolate this chamber from chamber 2. Solvent vapor, at ordinary temperature, e.g., ethyl alcohol vapor, is then admitted into chamber 1 through pipes 9a–9d and 10a–10d so that the chamber becomes filled with the vapor up to a concentration approaching the saturation point. Subsequently, and while the chamber 1 remains filled with the alcohol vapor, the valves 45 and 46 are opened so that the liquid 49 is released from the reservoirs 47 and 48 and discharges from pipe 42 in the form of sprays 49a over one face, face 52, of the glass sheet. In an actual example, wherein the vapor supplied to the chamber 1 was an ethyl alcohol vapor as above referred to, the solution sprayed onto the sheet from pipe 42 may be a solution formed by dissolving titanium chloride in ethyl alcohol, the solution having a viscosity of about 2 centipoises and containing, per liter of solution, sufficient titanium to form 8 grams of $TiO_2$. Over a period of one minute, a quantity of the solution equivalent to 1 liter per square meter of the sheet surface 52 is sprayed onto this surface. The face 52 thereby becomes covered by a layer 53 of the solution, as shown in FIG. 2. The surplus liquid 49a which runs off the surface 52 of the glass sheet collects in the lower portion of the chamber 1 and is subsequently removed via the conduit 13 by opening valve 14, after having taken the precaution of closing the valves 11a–11d and 12a–12d to prevent any loss of vapor from the vapor supply source. As soon as the surplus solution has been evacuated, the valve 14 is closed. Then the pipes 10a, 10b, 10c and 10d are connected to another reservoir (not shown) containing air having a relative humidity of about 30%, and the evacuation conduit 13 is connected to another reservoir (not shown) which is itself connected to a device for maintaining the interior of this other reservoir at sub-atmospheric pressure. The valves 12a, 12b, 12c, 12d and 14 are then opened to allow the alcohol vapors in chamber 1 to be sucked into the reduced pressure reservoir. At the same time the chamber becomes charged with the air at 30% relative humidity and the titanium compound in the coating solution hydrolyzes.

After the evacuation of the alcohol vapors, the shutters 15 are retracted into their housing 16 and the coated glass sheet is raised into the chamber 2. Once the sheet is located in the chamber 2 and the shutters 15 and 23 are closed, the valves of the lower pipes of chamber 2 are opened and air heated to 70° C., enters the chamber through these pipes from a source (not shown). In this way the organic solvent still remaining in the layer 53 is rapidly removed. In one actual process using the illustrated apparatus, the coated sheet was left in chamber 2 for 6 minutes at a temperature of 70° C. After the drying in chamber 2 has been completed, the shutters 23 are retracted into their housings 24, and the sheet of glass is quickly raised into the chamber 3 for oxidizing the coating 53. In order to avoid subjecting the glass sheet to a thermal shock on transfer to the chamber 3, this chamber is preheated to a temperature of about 70° C. by the admission of air having a temperature of 70° C. into the chamber through pipes 27a and 27b while the shutters 23 and 31 are closed. The shutters 31 remain closed when the shutters 23 are opened to allow the glass sheet to be raised into the chamber 3. Once the sheet is in chamber 3, the shutters 23 are closed again. The output from the heaters (not shown), which may be of any well-known type, used for heating the air admitted to chamber 3 is then stepped up and the temperature in chamber 3 is progressively raised to about 450° C. This temperature is maintained for about 15 minutes so that the layer is adequately oxidized, the titanium hydroxide becoming converted to titanium oxide. At the end of the oxidation stage the temperature of the air supplied to the interior of the chamber 3 is gradually lowered so that the sheet is gradually cooled in preparation for being withdrawn into the ambient air. By the above-described procedure a titanium dioxide layer of the order of 60 millimicrons in thickness can be formed.

The apparatus shown in FIGS. 1 and 2 is suitable for use in forming metal oxide coatings on small quantities of glass sheets.

It should be noted at this point that the thickness of the resulting metal oxide layer depends to a large extent on the concentration of the solution so that the possibility of controlling the coating thickness by controlling the concentration of the solution applied to the surface is of potential importance particularly in the coating of glass to form optical layers of various thicknesses.

The density of the solvent vapor atmosphere employed for the preparatory treatment of the surface, and the length of time during which the surface is exposed to this temperature, are also factors which influence the thickness of the metal oxide layer eventually formed. These factors have independent influences so that, for example, the coating thickness can be altered by lengthening or shortening the time during which the surface is in a solvent vapor atmosphere of given density.

The preferred methods of applying the metal compound solution are, as already mentioned, by spraying or pouring, the most preferred method being spraying, and when employing these methods the solution can easily be applied to one side only of the article to be coated, e.g., one side of a glass sheet. During application of the solution, the surface may have any desired orientation. In general, when coating material in film form, the most convenient orientation of the sheet in a mass processing plant involving automated transportation of the sheets through the processing unit is either vertical or horizontal.

The conditions under which the conversion of the dissolved metal compound or compounds takes place to form the metal oxide coating in situ depend on the nature of the dissolved metal compounds. When employing the invention for forming a titanium oxide coating the conversion may be achieved, as described in detail above, by a preliminary hydrolysis followed by heating until all of the solvent has evaporated.

The invention is primarily intended to be applied for forming coatings composed of a single metal oxide but coatings composed of oxides of two or more metals can be formed by using a metal compound solution containing different metal compounds convertible to different oxides.

Figure 3:
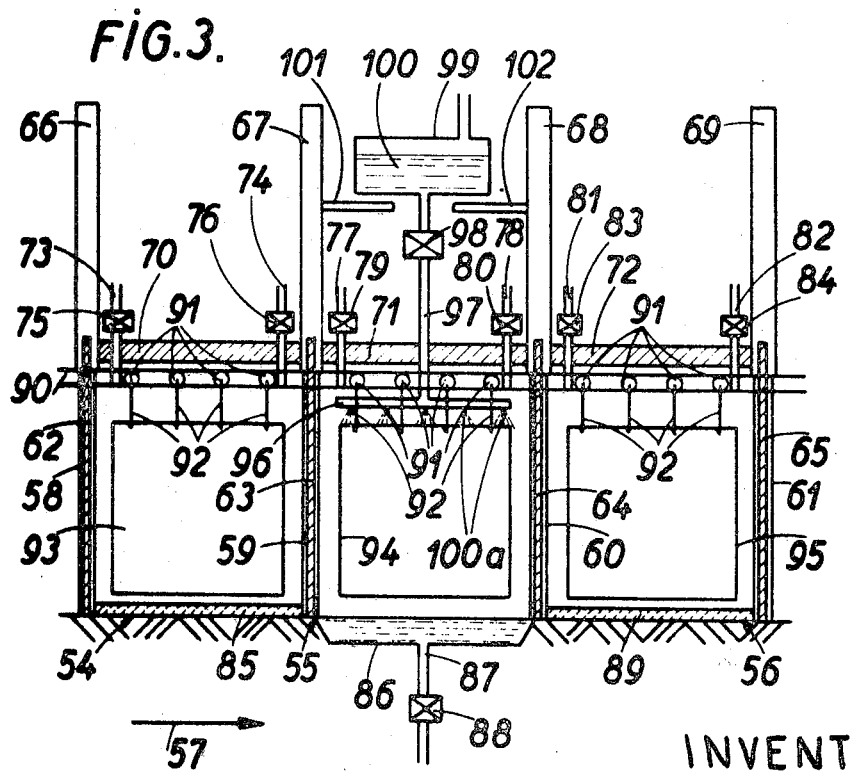
FIG. 3 is a cross-sectional, elevational view of another embodiment of apparatus according to the invention.

FIG. 3 shows an apparatus according to the present invention which is more suitable for coating large quantities of sheets on a mass production basis. In this apparatus there are three side-by-side chambers 54, 55 and 56 through which sheets to be coated can be conveyed in the direction indicated by the arrow 57. The chambers are bounded by two parallel longitudinal walls and by transverse walls 58, 59, 60 and 61. These transverse walls include displaceable panels, or partitions, 62, 63, 64 and 65, respectively, which can be raised into housing 66, 67, 68 and 69, respectively. The three chambers 54, 55 and 56 are closed at the top by top walls 70, 71 and 72, respectively. Two pipes extend into each chamber through its top wall. Thus, chamber 54 has two pipes 73 and 74 fitted with valves 75 and 76, respectively, chamber 55 has two pipes 77 and 78 fitted with valves 79 and 80, respectively, and chamber 56 has two pipes 81 and 82 with valves 83 and 84, respectively.

At the bottom of the chamber 54 there is a ceramic base 85. At the bottom of chamber 55 there is a metal sump 86 with an evacuation conduit 87 having a valve 88. At the bottom of chamber 56 there is a ceramic base 89.

A rail 90 extends through the three chambers 54, 55 and 56 and serves as a track for rollers 91 carrying tongs 92 for the attachment of glass sheets 93, 94 and 95.

In the upper portion of chamber 55 there is a spray pipe 96 which is connected, via a pipe 97 having a valve 98, to a reservoir 99 supplying a liquid 100. The reservoir 99 is supported by brackets 101 and 102 attached to the housings 67 and 68.

The installation illustrated in FIG. 3 operates as follows:

Once a sheet of glass, such as sheet 93, has moved into chamber 54, the panel 62 is lowered. The panel 63, which will normally be raised when panel 62 is raised to permit a glass sheet already treated in chamber 54 to pass from that chamber into chamber 55, is likewise lowered. Solvent vapors at normal room temperature are then admitted into chamber 54 through pipes 73 and 74. The vapor concentration is progressively increased up to a point close to the saturation point.

Subsequently, the panel 63 is raised and the sheet 93 is moved into chamber 55 to the position shown for sheet 94 in the drawing and at the same time sheet 94 moves on into chamber 56, panel 64 being raised just prior to this movement. As soon as sheet 93 moves into position in chamber 55, the panels 63 and 64 are lowered. Chamber 55 is filled with solvent vapors at normal room temperature, the vapors being admitted through pipes 77 and 78, so that the nature of the atmosphere in contact with a sheet does not change when the sheet moves from chamber 54 to chamber 55.

While sheet 93 is in chamber 55 one face of the sheet is sprayed with the solution 100, which is a solution of a metal compound dissolved in a quantity of the same solvent as that which constitutes the vapor atmosphere. This solution is released from reservoir 99 by opening valve 98 and issues from pipe 96 in the form of sprays 100a. The spraying continues for about one minute during which time a quantity of the solution 100 corresponding to about 1 liter per square meter of the surface to be coated flows down this surface so as to cover it with a liquid layer similar to the layer 53 shown in FIG. 2. The surplus solution collects in the sump 86 and is eventually discharged through the conduit 87 by opening the valve 88, after taking the precaution of closing the valves 79 and 80 to shut off the supply of solvent vapors.

Valve 88 is then closed, after which solvent vapors remaining in the chamber 55 are evacuated in the following manner. First, the pipes 77 and 78 are placed in communication with another reservoir (not shown) containing air having a relative humidity of about 30% and the evacuation conduit 87 is placed in communication with a reservoir (not shown) the interior of which is maintained at sub-atmospheric pressure. The valves 79, 80 and 88 are then opened so that the solvent vapors in the chamber 55 become drawn off and replaced by air having a relative humidity of about 30%.

After this treaatment of the sheet in chamber 55 with humid air, the panels 62, 63, 64 and 65 are raised and sheet 93 moves into chamber 56. At the same time, the sheet previously in that chamber moves out of the apparatus and the place occupied by sheet 93 in chamber 55 becomes occupied by a following sheet from chamber 54. Once the sheets have taken up their new positions, the panels 62, 63, 64 and 65 are closed again. The valves 83 and 84 are then opened to admit air heated to 90° C. into the chamber 56 to cause the organic solvent still remaining in the layer covering the coated surface of sheet 93 to be rapidly eliminated.

The oxidizing of the coating layers on the sheets leaving the apparatus of FIG. 3 may be achieved by moving the sheets through a further enclosure between infra-red lamps, for example.

In an actual process using apparatus as shown in FIG. 3, the vapor contact treatment was carried out using butyl alcohol and the solution applied through spray pipe 96 was a solution of titanium chloride in butyl alcohol containing, per liter of solution, an amount of titanium sufficient to form 20 grams of $TiO_2$. Any type of butyl alcohol can be used, such as $CH_3$—$CH_2$—$CH_2$—$CH_2OH$, for instance.

The drying in chamber 56 took place at a temperature of 90° C. and lasted 5 minutes. Firing of the coating layer was achieved by heating the coated sheet to a temperature of 400° C. for 15 minutes. A thin layer of titanium oxide was obtained which had a uniform thickness of the order of 150 millimicrons.

The apparatus shown in FIGS. 4 and 5 includes a conveyor 103 (FIG. 5) composed of vertical side supports 104, horizontal members 105, and sheet transporting rollers 106 mounted between members 105 for conveying horizontally oriented sheets to be coated through three chambers 107, 108 and 109, in the direction of arrow 110 (FIG. 4). The three chambers 107, 108 and 109 have lower portions in the form of tanks 111, 112 and 113, respectively, and upper cover portions 114, 115 and 116, respectively. The tanks 111–113 are carried by the vertical side supports 104 (connection not shown), and the cover portions 114–116 are supported by plates 117 and 118 each welded to a respective horizontal member 105. The successive chambers 107, 108 and 109 are connected to pairs of pipes 119–120, 121–122 and 123–124, respectively. These pipes are fitted with valves 125–126, 127–128, 129–130, respectively.

By virtue of the fact that the cover portions are spaced slightly above the lower tank portions of the chambers, each chamber has a respective inlet slot 131, 132, or 133 and a respective outlet slot 134, 135, or 136, each slot being just high enough to permit the passage of the glass sheets to be coated. The middle chamber 108 is provided with an evacuation conduit 137 having a valve 138, and a spray pipe 139 disposed horizontally within the chamber and supplied, via a pipe 140 having a valve 141, from a reservoir 142. When valve 141 is opened to release metal compound solution 143 from the reservoir 142, the liquid is sprayed onto the top surfaces of successive glass sheets 146, 145 and 144 as they are conveyed through the chamber, the spraying occurring continuously, as each sheet passes under spray 143a, to form a metal compound solution layer 147 on each sheet.

The apparatus shown in FIGS. 4 and 5, functions in a manner similar to that of the apparatus shown in FIG. 3, except that the sheets to be coated are transported in a horizontal position through the chambers for the successive processing treatments and the chambers are provided with horizontal slots for the passage of the sheets. These slots permit only restricted communication between the three chambers and between chambers 107 and 109 and the atmosphere, and the provision of displaceable partitions or panels is not necessary.

As stated before, it is possible to add to the solvent a wetting agent or surfactant, for instance alkyl-benzenesulfonate of sodium, sodium tripolyphosphate, . . . The concentration to be used is about 1%.

Other compounds to which the process according to the invention applies to form a metal oxide layer are titanium-, tin-, zirconium-, chromium-, zinc-butylate-, ethylate-, propylene-glycolate, or -phenylglucidate. When using the latter, the alcohol is first dissolved in carbontetrachloride.

It will be understood that the above description of the present invention is susceptible to various modifications, changes and adaptations, and the same are intended to be comprehended within the meaning and range equivalents of the appended claims.

We claim:

1. In a process for forming a metal oxide layer in situ from a solution of a compound of the metal other than the oxide thereof and on a substrate surface the improvement wherein the substrate surface is provided with a film of organic solvent for the compound prior to contact with the solution of the compound, said solution being an organic solvent compatible with the film solvent.

2. A process according to claim 1 wherein the solution solvent is the same as the film solvent.

3. A process according to claim 1, comprising the steps of:
   (a) forming on the substrate surface a film of organic solvent for the compound;
   (b) uniformly applying to said surface and in an inert atmosphere an organic solvent solution of said compound; and
   (c) converting the applied metal compound into at least one metal oxide to form the layer.

4. A process according to claim 3 consisting essentially of:
   (a) forming on the substrate surface a film of organic solvent for the compound;
   (b) uniformly applying to said surface and in an inert atmosphere free from water vapor an organic solvent solution of said compound; and
   (c) converting the applied metal compound into at least one metal oxide to form the layer.

5. A process according to claim 3 wherein the substrate is glass.

6. A process according to claim 3 wherein the film of organic solvent is formed by exposing the surface to an atmosphere of vapor of said solvent.

7. A process according to claim 6 wherein the vapor concentration is near the saturation point.

8. A process according to claim 3 wherein the solution of said compound is applied to the substrate surface by spraying said solution onto said surface.

9. A process according to claim 6 wherein the vapor is that of at least one alcohol, the metal is titanium, the solution is applied as a uniform coating to the substrate surface while said surface is exposed to the alcohol vapor, the titanium compound in the coating is hydrolyzed and the solvent of said solution is evaporated prior to forming the metal oxide layer.

10. A process according to claim 3 wherein the applied metal compound is converted into at least one metal oxide by hydrolysis followed by heating at a temperature sufficient to form the metal oxide layer.

References Cited

UNITED STATES PATENTS 2,957,787    10/1960    Koller _____ 117—124 XR

ALFRED L. LEAVITT, Primary Examiner

W. F. CYRON, Assistant Examiner

U.S. Cl. X.R.

117—49, 123, 124, 127, 138.8